United States Patent
Hashimoto

(10) Patent No.: US 10,041,469 B2
(45) Date of Patent: Aug. 7, 2018

(54) METHOD FOR MAINTAINING FLOATING-BODY TYPE WIND TURBINE POWER GENERATING APPARATUS

(71) Applicant: MHI VESTAS OFFSHORE WIND A/S, Aarhus N (DK)

(72) Inventor: Jun Hashimoto, Tokyo (JP)

(73) Assignee: MHI VESTAS OFFSHORE WIND A/S, Aarhus N (DK)

( * ) Notice: Subject to any disclaimer, the term of this patent is extended or adjusted under 35 U.S.C. 154(b) by 312 days.

(21) Appl. No.: 14/760,903

(22) PCT Filed: Jan. 21, 2013

(86) PCT No.: PCT/JP2013/051052
§ 371 (c)(1),
(2) Date: Jul. 14, 2015

(87) PCT Pub. No.: WO2014/112115
PCT Pub. Date: Jul. 24, 2014

(65) Prior Publication Data
US 2016/0025064 A1    Jan. 28, 2016

(51) Int. Cl.
*B63B 1/04* (2006.01)
*B63B 35/44* (2006.01)
(Continued)

(52) U.S. Cl.
CPC .............. *F03D 1/003* (2013.01); *B63B 1/048* (2013.01); *B63B 1/107* (2013.01); *B63B 21/50* (2013.01);
(Continued)

(58) Field of Classification Search
CPC .......... F03D 1/003; F03D 13/10; F03D 13/25; F03D 13/40; F03D 80/50; F03D 9/255;
(Continued)

(56) References Cited

U.S. PATENT DOCUMENTS 7,075,189 B2 *   7/2006   Heronemus ............. B63B 1/047
290/44
7,086,809 B2 *   8/2006   Busso ................. B63B 35/4413
114/264
(Continued)

FOREIGN PATENT DOCUMENTS

CN    101595303 A    12/2009
CN    101988477 A     3/2011
(Continued)

OTHER PUBLICATIONS

PCT/IB/338, "Notification of Transmittal of Copies of Translation of the International Preliminary Report on Patentability for International Application No. PCT/JP2013/051052," dated Jul. 30, 2015.
(Continued)

*Primary Examiner* — Benjamin F Fiorello
(74) *Attorney, Agent, or Firm* — Manabu Kanesaka; Benjamin Hauptman; Kenneth Berner

(57) ABSTRACT

A method of maintaining a power generating apparatus includes a separation step of separating a mooring line and a cable from a floating body of a first floating-body type wind turbine power generating apparatus including a maintenance-target section; a retention step of retaining the mooring line and the cable by a floating-body structure, after the separation step; a first transfer step of transferring the first floating-body type wind turbine power generating apparatus from the mooring position, after the separation step; a second transfer step of transferring a second floating-body type wind turbine power generating apparatus having no maintenance-target section to the mooring position; and a connection step of detaching the mooring line and the cable from the floating-body structure and connecting the mooring line and the cable to the second floating-body type wind
(Continued)

turbine power generating apparatus, after the second transfer step.

12 Claims, 9 Drawing Sheets

(51) Int. Cl.
| | |
|---|---|
| *F03D 7/02* | (2006.01) |
| *F03D 1/00* | (2006.01) |
| *F03D 9/32* | (2016.01) |
| *F03D 9/25* | (2016.01) |
| *B63B 1/10* | (2006.01) |
| *B63B 21/50* | (2006.01) |
| *F03D 7/04* | (2006.01) |
| *F03D 13/25* | (2016.01) |
| *F03D 13/10* | (2016.01) |
| *F03D 13/40* | (2016.01) |
| *F03D 80/50* | (2016.01) |
| *F03D 9/28* | (2016.01) |
| *B63B 39/03* | (2006.01) |
| *B63B 9/06* | (2006.01) |
| *B63B 1/12* | (2006.01) |

(52) U.S. Cl.
CPC .............. *B63B 35/44* (2013.01); *B63B 39/03* (2013.01); *F03D 7/0264* (2013.01); *F03D 7/042* (2013.01); *F03D 9/25* (2016.05); *F03D 9/255* (2017.02); *F03D 9/28* (2016.05); *F03D 9/32* (2016.05); *F03D 13/10* (2016.05); *F03D 13/25* (2016.05); *F03D 13/40* (2016.05); *F03D 80/50* (2016.05); *B63B 2001/044* (2013.01); *B63B 2001/128* (2013.01); *B63B 2009/067* (2013.01); *B63B 2021/505* (2013.01); *B63B 2035/446* (2013.01); *F05B 2240/93* (2013.01); *F05B 2240/95* (2013.01); *Y02E 10/727* (2013.01)

(58) Field of Classification Search
CPC .......... F03D 7/0264; F03D 7/042; F09D 9/28; B63B 1/048; B63B 1/107; B63B 21/50; B63B 35/44; B63B 39/03
See application file for complete search history.

(56) References Cited

U.S. PATENT DOCUMENTS

| | | |
|---|---|---|
| 8,154,142 B2 | 4/2012 | Nies |
| 2011/0037264 A1 | 2/2011 | Roddier et al. |
| 2011/0241347 A1 | 10/2011 | Boureau et al. |
| 2012/0261917 A1* | 10/2012 | Egedal .................. F03D 7/026 290/44 |

FOREIGN PATENT DOCUMENTS

| | | |
|---|---|---|
| CN | 102015435 A | 4/2011 |
| CN | 102282361 A | 12/2011 |
| EP | 1134410 A1 | 9/2001 |
| EP | 2428443 A1 | 3/2012 |
| JP | H05-010942 A | 1/1993 |
| JP | H09-021526 A | 1/1997 |
| JP | 3063039 B2 | 7/2000 |
| JP | 2001-119898 A | 4/2001 |
| JP | 2010-223113 A | 10/2010 |
| JP | 2010-223114 A | 10/2010 |
| JP | 2010-234965 A | 10/2010 |
| JP | 2011-521820 A | 7/2011 |
| JP | 2011-207446 A | 10/2011 |
| JP | 2012-045981 A | 10/2011 |
| JP | 2012-201191 A | 10/2012 |

OTHER PUBLICATIONS

PCT/IB/373, "International Preliminary Report on Patentability for International Application No. PCT/JP2013/051052," dated Jul. 21, 2015.
PCT/ISA/237, "Written Opinion of the International Searching Authority for International Application No. PCT/JP2013/051052," dated May 7, 2013.
PCT/IB/326, "Notification Concerning Transmittal of International Preliminary Report on Patentability for International Application No. PCT/JP2013/051052," dated Jul. 30, 2015.
Europe Patent Office, "Search Report for European Patent Application No. 13872167.5," dated Dec. 10, 2015.
China Patent Office, "Office Action for Chinese Patent Application No. 201380070900.7," dated Aug. 1, 2016.
Korea Patent Office, "Office Action for Korean Patent Application No. 10-2015-7017870," dated Apr. 27, 2017.
PCT, "International Search Report for International Application No. PCT/JP2013/051052," dated May 7, 2013.
Japan Patent Office, "Office Action for Japanese Patent Application No. 2014-557297," dated Feb. 2, 2017.
China Patent Office, "Decision of Rejection for Chinese Patent Application No. 201380070900.7," dated Jul. 11, 2017.

* cited by examiner

Maintenance site

… (1/2)

METHOD FOR MAINTAINING FLOATING-BODY TYPE WIND TURBINE POWER GENERATING APPARATUS

RELATED APPLICATIONS

The present application is National Phase of International Application No. PCT/JP2013/051052 filed Jan. 21, 2013, the disclosure of which is hereby incorporated by reference herein in its entirety.

TECHNICAL FIELD

The present disclosure relates to a method for maintaining a floating-body type wind turbine power generating apparatus including a wind turbine generator disposed on a floating body.

BACKGROUND

Wind turbine power generating apparatuses have become increasingly popular in recent years in view of preservation of the global environment. Especially, there are plans being developed in many regions, for building large wind turbine power generating apparatuses which are advantageous in improving power generation efficiency on water such as ocean and lake.

As a wind turbine power generating apparatus disposed on the water, known is a floating-body type wind turbine power generating apparatus including a wind turbine generator disposed on a floating-body floating on the water surface. In a general floating-body type wind turbine power generating apparatus, a floating-body is connected to anchors disposed on the water bottom via mooring lines so that the floating-body is moored on a predetermined position on the water. For instance, Patent Documents 1 to 3 disclose a method of towing a floating-body type wind turbine power generating apparatus which has been assembled in advance to a predetermined position on the water. Such a floating-body type wind turbine power generating apparatus is normally maintained while the floating body is moored on a predetermined position on the water.

For the purpose of facilitating maintenance works at high places, Patent Document 4 discloses a method for submerging and mounting a tower of a wind turbine power generating apparatus onto the water bottom upon maintenance. Further, Patent Documents 5 and 6 disclose a configuration in which a tower of a wind turbine power generating apparatus is submerged in a spar upon maintenance.

CITATION LIST

Patent Literature

Patent Document 1: EP2428443A
Patent Document 2: JP2010-234965A
Patent Document 3: 2011-207446A
Patent Document 4: 2012-45981A
Patent Document 5: 2010-223113A
Patent Document 6: 2010-223114A

SUMMARY

Problems to be Solved

In a floating-body type wind turbine power generating apparatus, a floating body sways from being affected by the surrounding environment such as wind and waves. Thus, the work stability during maintenance is low. Especially when a floating-body type wind turbine power generating apparatus is installed at a site with advantageous wind conditions, the wind velocity is relatively high and therefore waves are also high. Under such severe conditions of the surrounding environment such as wind and waves, performing maintenance works on the water is even more difficult. Thus, there is a need for techniques to enable maintenance works regardless of the conditions of the surrounding environment such as wind and waves.

In this regard, although Patent Documents 1 to 3 disclose a method for towing a floating-body type wind turbine power generating apparatus, they do not disclose any method for performing maintenance on a floating-body type wind turbine power generating apparatus. Further, Patent Documents 4 to 6 only disclose a configuration in which a tower is moved downward to facilitate maintenance works at high places when maintenance is performed on a floating-body type wind turbine power generating apparatus on ocean. In Patent Documents 4 to 6, sway of the floating body is not taken into account.

An object of at least one embodiment of the present invention is to provide a method for maintaining a floating-body type wind turbine power generating apparatus, whereby it is possible to perform maintenance works regardless of conditions of the surrounding environment such as wind and waves.

Solution to Problems

A method of maintaining a floating-body type wind turbine power generating apparatus according to at least one embodiment of the present invention is for a wind turbine power generating apparatus including a wind turbine generator disposed on a floating body moored at a mooring position by a mooring line. The floating-body type wind turbine power generating apparatus is configured to supply electric power generated by the wind turbine generator to a cable. The method includes: a separation step of separating the mooring line and the cable from the floating body of a first floating-body type wind turbine power generating apparatus including a maintenance-target section; a retention step of retaining the mooring line and the cable by a floating-body structure, after the separation step; a first transfer step of transferring the first floating-body type wind turbine power generating apparatus from the mooring position, after the separation step; a second transfer step of transferring a second floating-body type wind turbine power generating apparatus having no maintenance-target section to the mooring position; and a connection step of detaching the mooring line and the cable from the floating-body structure and connecting the mooring line and the cable to the second floating-body type wind turbine power generating apparatus, after the second transfer step.

In the present specification, a "floating-body structure" includes a buoy and a structure floating on the water surface. Further, a "mooring position" is a position where the floating body is moored while the wind turbine power generating apparatus is in operation.

In the above method of maintaining a floating-body type wind turbine power generating apparatus, the first floating-body type wind turbine power generating apparatus including a maintenance-target section is transferred from the mooring position, and the second floating-body type wind turbine power generating apparatus including no maintenance-target section is transferred to the mooring position.

In this way, it is possible to carry out an extensive maintenance work that is not suitable for maintenance at the mooring position of the wind turbine power generating apparatus at another location. Specifically, maintenance can be performed under a more stable work environment, such as a position on water (for instance, by a shore) or on land (for instance, in a dock) where the conditions of the surrounding environment such as wind and waves is calmer than that of the mooring position, or a position where the wind turbine power generating apparatus is berthed along a pier. Thus, it is possible to perform maintenance on the floating-body type wind turbine power generating apparatus regardless of the conditions of the surrounding environment of the mooring position of the wind turbine power generating apparatus.

Further, when the first floating-body type wind turbine power generating apparatus is transferred, the mooring line and the cable are separated from the floating body and retained by the floating-body structure, which makes it possible to connect the mooring line and the cable easily to the floating body when the second floating-body type wind turbine power generating apparatus is to be transferred.

In the above method of maintaining a floating-body type wind turbine power generating apparatus, the first floating-body type wind turbine power generating apparatus and the second floating-body type wind turbine power generating apparatus may be the same, or may be different.

In some embodiments, the method further includes a maintenance step of performing maintenance on the first floating-body type wind turbine power generating apparatus to obtain the second floating-body type wind turbine power generating apparatus, after the first transfer step.

As described above, it is possible to operate the wind turbine power generation system without preparing a floating-body type wind turbine power generating apparatus for replacement as a premise, by performing maintenance on the first floating-body type wind turbine power generating apparatus and then returning the same wind turbine power generating apparatus to the mooring position as the second floating-body type wind turbine power generating apparatus. That is, it is possible to run the wind turbine power generation system while reducing the installation cost. A wind turbine power generation system here refers to a combination of at least one floating-body type wind turbine power generating apparatus.

In some embodiments, in the second transfer step, the second floating-body type wind turbine power generating apparatus, which is not the first floating-body type wind turbine power generating apparatus, is transferred to the mooring position.

As described above, it is possible to operate the second floating-type wind turbine power generating apparatus while maintenance is performed on the first floating-body type wind turbine power generating apparatus by transferring the first floating-body type wind turbine power generating apparatus away from the mooring position and then transferring another apparatus, which is the second floating-body type wind turbine power generating apparatus, to the mooring position. As a result, it is possible to improve the facility operation rate of the wind turbine power generation system.

In the above embodiment, the second floating-body type wind turbine power generating apparatus may be a wind turbine power generating apparatus having undergone maintenance after being used, or an unused wind turbine power generating apparatus.

In some embodiments, the method further includes an operation-check step of checking operation of the second floating-body type wind turbine power generating apparatus at a site for operation check, before the second transfer step.

In a case where the operation check is performed after the second floating-body type wind turbine power generating apparatus is transferred to the mooring position, if there is a problem in the check result, it may be necessary to return the second floating-body type wind turbine power generating apparatus to the maintenance site again. Thus, in the above embodiment, the operation check is performed before the second floating-body type wind turbine power generating apparatus is transferred to the mooring position, which makes it possible to perform the work of installing the second floating-body type wind turbine power generating apparatus to the mooring position efficiently.

Further, it is possible to perform the operation check in a more stable work environment, such as a site on ocean or land where the conditions of the surrounding environment like wind and waves are calmer than those of the mooring position, or a position where the floating-body type wind turbine power generating apparatus is berthed along a pier. Thus, it is possible to improve efficiency of the work for operation check.

In some embodiments, the floating-body type wind turbine power generating apparatus includes a ballast pump for floating and submerging the floating body, and a floating-body control center for controlling the ballast pump. The ballast pump and the floating-body control center are disposed on a lower part of a tower of the wind turbine generator or the floating body. In the operation-check step, electric power is supplied to the ballast pump from an electric power source under control of the floating-body control center, and the ballast pump is operated to check float/sink operation of the floating body, at the site for operation check.

In this way, it is possible to check the float/sink operation of the floating body of the wind turbine generator before the second floating-body type wind turbine power generating apparatus is transferred to the mooring position. Thus, it is possible to prevent an event in which the second floating-body type wind turbine power generating apparatus inevitably needs to be returned to the maintenance site due to a failure in the float/sink operation of the floating body after installation of the second floating-body type wind turbine power generating apparatus to the mooring position. Further, it is possible to perform the operation check under a more stable work environment than that of the mooring position, which makes it possible to improve efficiency of the work for checking float/sink operation.

Further, since the ballast pump and the floating-body control center are disposed on a lower part of the tower of the wind turbine generator or the floating body, it is possible to check the float/sink operation of the floating body even before the wind turbine generator is completely assembled on the floating body. Here, if there is an abnormality found in the float/sink operation of the floating body after the wind turbine generator has been completely assembled on the floating body, it may be necessary to dismantle the wind turbine generator partially. In contrast, if the float/sink operation of the floating body is checked before the wind turbine generator has been completely assembled on the floating body, it is possible to minimize dismantlement of the wind turbine generator.

In some embodiments, the floating-body type wind turbine power generating apparatus includes an auxiliary machine of the wind turbine generator and an emergency control center for controlling the auxiliary machine. In the operation-check step, electric power is supplied to the auxiliary machine from an electric power source under control of the emergency control center, and operation of the auxiliary machine is checked, at the site for operation check.

In this way, it is possible to check the operation of the auxiliary machine of the wind turbine generator before the second floating-body type wind turbine power generating apparatus is transferred to the mooring position. Thus, it is possible to prevent an event in which the second floating-body type wind turbine power generating apparatus inevitably needs to be returned to the maintenance site due to a failure in the auxiliary machine of the wind turbine generator after installation of the second floating-body type wind turbine power generating apparatus to the mooring position. Further, it is possible to check operation of the auxiliary machine under a more stable work environment than that of the mooring position, which makes it possible to improve efficiency of the work for operation check.

In some embodiments, the electric power source is a backup electric power source for supplying electric power to each part of the floating-body type wind turbine power generating apparatus in case of emergency. The floating-body type wind turbine power generating apparatus includes a fuel tank for supplying a fuel for power generation to the backup electric power source. In the operation-check step, the fuel for power generation is supplied to the backup electric power source from the fuel tank to check operation of the backup electric power source.

In this way, it is possible to check the operation of the backup electric power source before the second floating-body type wind turbine power generating apparatus is transferred to the mooring position. Thus, it is possible to prevent an event in which the second floating-body type wind turbine power generating apparatus inevitably needs to be returned to the maintenance site due to a failure in the backup electric power source after installation of the second floating-body type wind turbine power generating apparatus to the mooring position. Further, it is possible to check operation of the backup electric power source under a more stable work environment than that of the mooring position, which makes it possible to improve efficiency of the work for operation check.

In some embodiments, the floating-body type wind turbine power generating apparatus includes an interior electric distribution network disposed between a generator of the wind turbine generator and the cable. The interior electric distribution network includes a transformer and a switch. In the operation-check step, operation of the interior electric distribution network is checked at the site for operation check.

In this way, it is possible to check the operation of the interior electric distribution network before the second floating-body type wind turbine power generating apparatus is transferred to the mooring position. Thus, it is possible to prevent an event in which the second floating-body type wind turbine power generating apparatus inevitably needs to be returned to the maintenance site due to a failure in the interior electric distribution network after installation of the second floating-body type wind turbine power generating apparatus to the mooring position. Further, it is possible to check operation of the interior electric distribution network under a more stable work environment than that of the mooring position, which makes it possible to improve efficiency of the work for operation check.

In some embodiments, the floating-body type wind turbine power generating apparatus includes a pitch drive mechanism for varying a pitch angle of a blade of the wind turbine generator, and a nacelle control center disposed inside a nacelle of the wind turbine generator and configured to control devices including the pitch drive mechanism. In the operation-check step, electric power is supplied to the pitch drive mechanism from an electric power source under control of the nacelle control center to check operation of the pitch drive mechanism, while the blade and the nacelle are mounted to the second floating-body type wind turbine power generating apparatus.

In this way, it is possible to check the operation of the pitch drive mechanism before the second floating-body type wind turbine power generating apparatus is transferred to the mooring position. Thus, it is possible to prevent an event in which the second floating-body type wind turbine power generating apparatus inevitably needs to be returned to the maintenance site due to a failure in the pitch drive mechanism after installation of the second floating-body type wind turbine power generating apparatus to the mooring position.

Further, it is possible to check operation of the pitch drive mechanism under a more stable work environment than that of the mooring position, which makes it possible to improve efficiency of the work for operation check.

In some embodiments, in the maintenance step, a blade of the first floating-body type wind turbine power generating apparatus is replaced while the first floating-body type wind turbine power generating apparatus is berthed along a pier.

A blade of the first floating-body type wind turbine power generating apparatus has a great length. Thus, replacing the blade while the first floating-body type wind turbine power generating apparatus is berthed along a pier to stabilize the floating-body makes it possible to improve the work efficiency and to use a large crane.

In some embodiments, in the maintenance step, a unit constituting at least a part of a drivetrain of the first floating-body type wind turbine power generating apparatus is replaced while the first floating-body type wind turbine power generating apparatus is berthed along a pier.

A drivetrain of the first floating-body type wind turbine power generating apparatus has a great size as well as a great weight. Thus, replacing a unit constituting at least a part of the drivetrain while the first floating-body type wind turbine power generating apparatus is berthed along a pier to stabilize floating-body makes it possible to improve the work efficiency and to use a large crane.

In some embodiments, the drivetrain includes a hydraulic transmission for transmitting rotation energy of a rotor of the wind turbine generator to a generator, the hydraulic transmission including a hydraulic pump and a hydraulic motor. The unit is at least one of the hydraulic pump, the hydraulic motor or the generator.

Effects of the Invention

According to at least one embodiment of the present invention, it is possible to perform maintenance on the floating-body type wind turbine power generating apparatus regardless of the conditions of the surrounding environment of the mooring position, by transferring the first floating-body type wind turbine power generating apparatus away from the mooring position and transferring the second floating-body type wind turbine power generating apparatus having no maintenance-target section to the mooring position.

Further, it is possible to connect the mooring line and the cable easily to the floating body when the second floating-body type power generating apparatus is to be moored, by separating the mooring line and the cable from the floating body and retaining the mooring line and the cable with the floating-body structure when the first floating-body type wind turbine power generating apparatus is transferred.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Now, a floating-body type wind turbine power generating apparatus 1 being a maintenance target according to one embodiment of the present invention will be described. Then, a method of maintaining the same will be described.

While the floating-body type wind turbine power generating apparatus 1 described below as an example is disposed on the ocean, an installation site for the floating-body type wind turbine power generating apparatus 1 is not limited to a site on the ocean, but may be any place on the water such as a site on a lake or a river. Further, while the floating-body type wind turbine power generating apparatus 1 described in the present specification as an example includes a semi-submersible type floating body 10, the present invention may be applied to a floating-body type wind turbine power generating apparatus including a floating body of another type such as a spar type.

Figure 1:
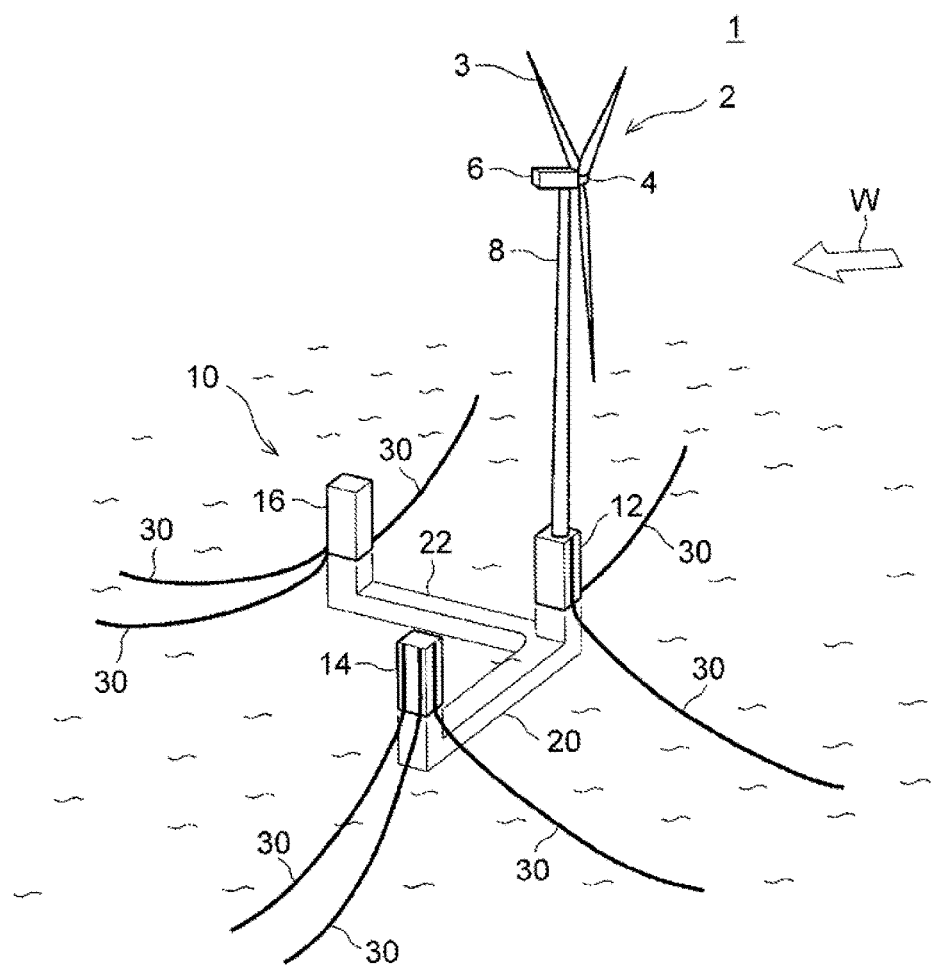
FIG. 1 is a perspective view of a floating-body type wind turbine power generating apparatus being moored on ocean, according to one embodiment of the present invention.
Figure 2:
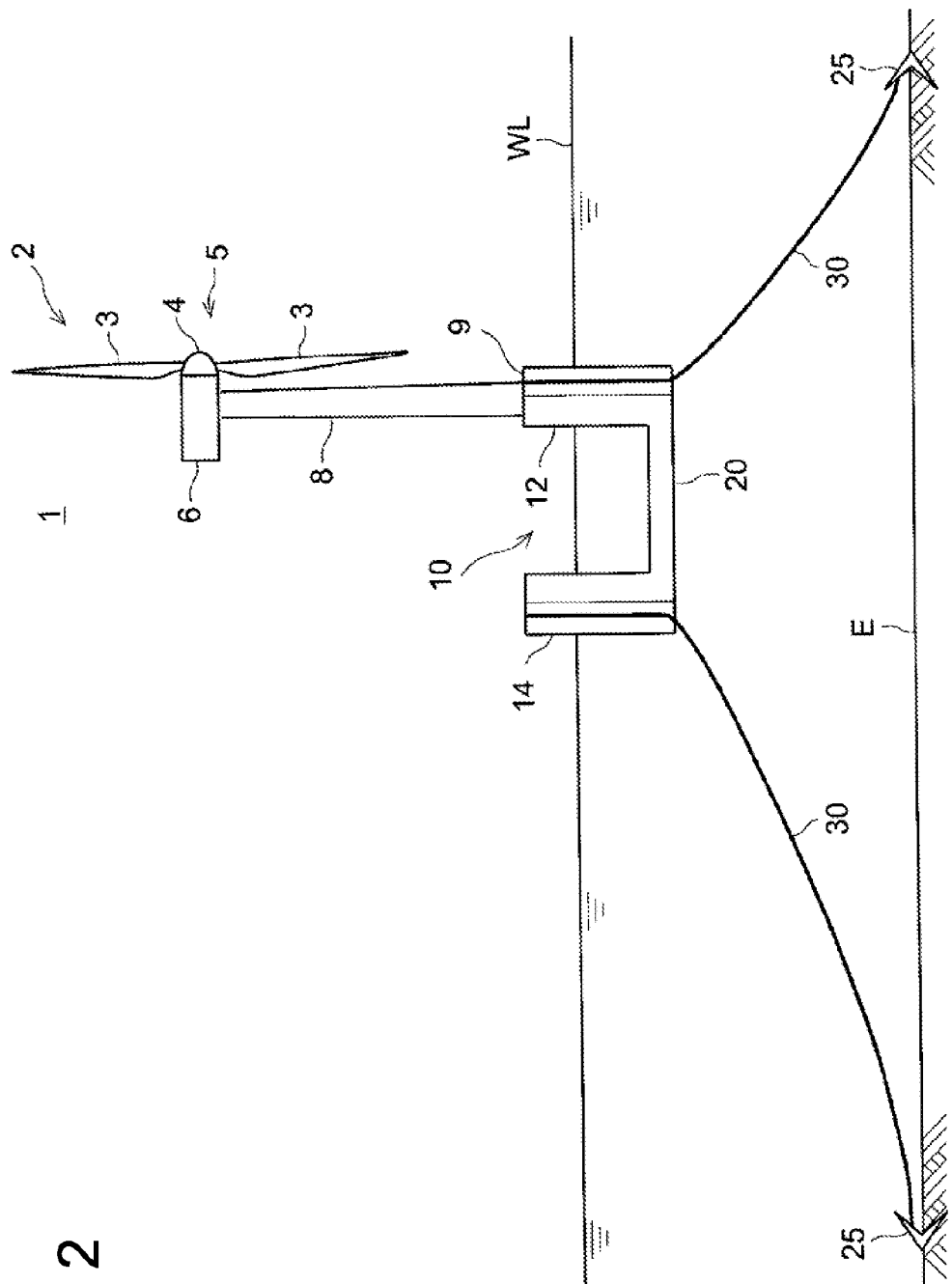
FIG. 2 is a side view of the floating-body type wind turbine power generating apparatus of FIG. 1, seen from the side.
Figure 3:
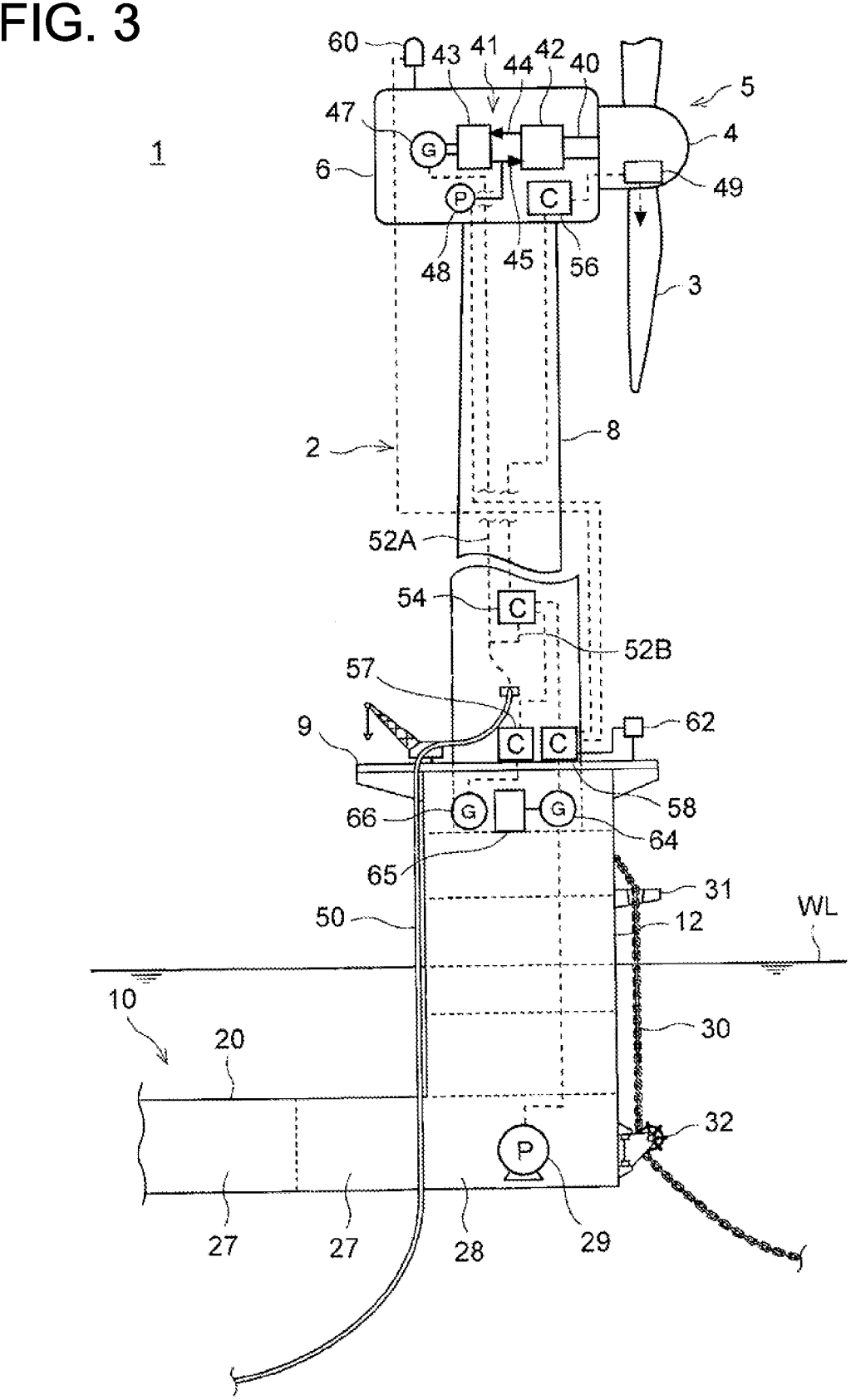
FIG. 3 is a side view of a device configuration example of a floating-body type wind turbine power generating apparatus according to one embodiment of the present invention.
Figure 4:
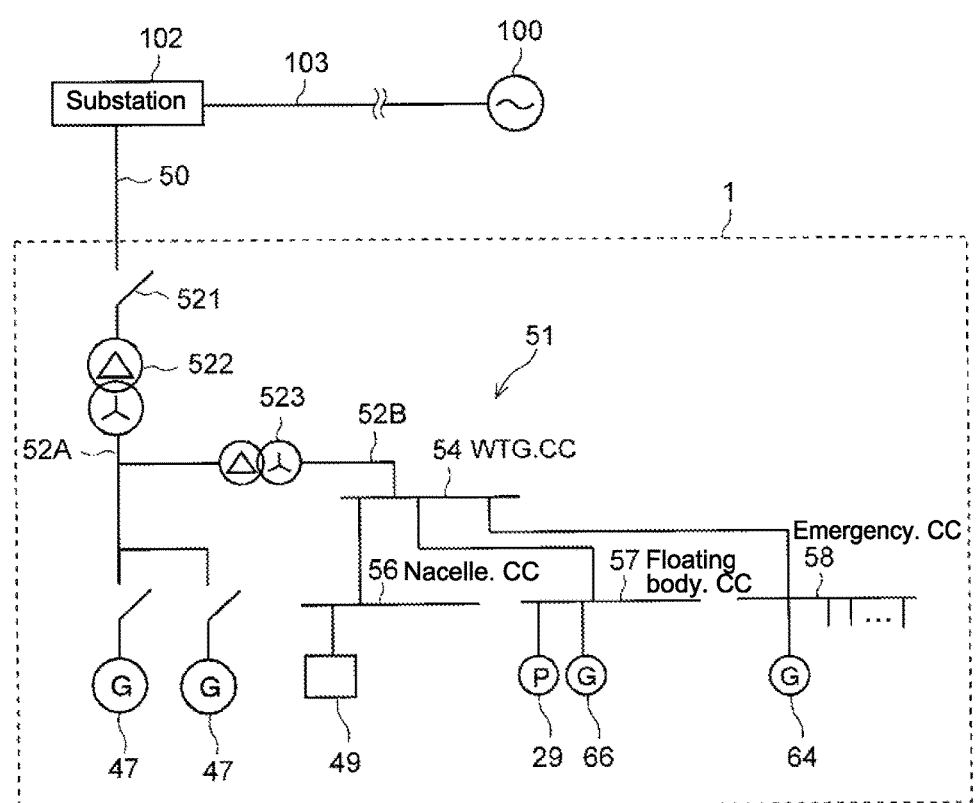
FIG. 4 is a configuration diagram of an electric system of a floating-body type wind turbine power generating apparatus according to one embodiment of the present invention.

FIG. 1 is a perspective view of a floating-body type wind turbine power generating apparatus being moored on ocean, according to one embodiment of the present invention. FIG. 2 is a side view of the floating-body type wind turbine power generating apparatus of FIG. 1, seen from the side. FIG. 3 is a side view of a device configuration example of a floating-body type wind turbine power generating apparatus according to one embodiment of the present invention. FIG. 4 is a configuration diagram of an electric system of a floating-body type wind turbine power generating apparatus according to one embodiment of the present invention.

As illustrated in FIGS. 1 and 2, the floating-body type wind turbine power generating apparatus 1 includes a floating body 10 floating on the water surface and a wind turbine generator 2 erected on the floating body 10.

In one embodiment, the wind turbine generator 2 includes at least one blade 3 which rotates by receiving wind, a hub 4 to which the blade 3 is mounted, a nacelle 6 to which the hub 4 is rotatably mounted, and a tower 8 that supports the nacelle 6. The nacelle 6 may be capable of yaw rotating with respect to the tower 8, and in a case of a typical upwind-type wind turbine, the nacelle 6 slews so that the blade 3 is oriented toward the upwind side in accordance with the wind direction. Then, the blade 3 rotates upon receiving wind, so that the generator generates electric power. The specific configuration of devices constituting the wind turbine generator 2 will be described below.

In one embodiment, the floating body 10 includes three pillar-shaped columns 12, 14, 16 disposed on vertex positions of a virtual triangle in a planar view, the first lower hull 20 having an elongated shape and connecting the first column 12 and the second column 14, and the second lower hull 22 having an elongated shape and connecting the first column 12 and the third column 16. The three columns 12, 14, 16 and the two lower hulls 20, 22 together form the floating body 10 into a substantially V shape in a planar view. A platform 9 is disposed on the upper surface of the first column 12 disposed in the middle of the substantially V shape in a planar view, and the above wind turbine generator 2 is disposed on the platform 9.

Further, the first lower hull 20 and the second lower hull 22 may intersect with each other at a right angle, and the above three columns 12, 14, 16 may be disposed on vertex positions of a virtual isosceles right triangle which is symmetric about a bisector of an intersection angle of the first lower hull 20 and the second lower hull 22.

In the above embodiment, the lower hulls 20, 22 are illustrated as joint sections for respectively connecting the first column 12 to the second column 14, and the first column 12 to the third column 16. However, the joint sections are not limited to these. As another configuration example of the floating body 10, the floating body 10 may further include the third lower hull connecting the second column 14 and the third column 16. As yet another configuration example, the first lower hull 20 and the second lower hull 22 may be coupled by a beam member for reinforcement.

In one embodiment, as illustrated in FIG. 3, at least one ballast chamber 27 for storing ballast water is formed inside the floating body 10, i.e., inside the columns 12, 14, 16 or the lower hulls 20, 22. A plurality of ballast chambers 27 may be provided. Further, a pump chamber 28 may be disposed on the floating body 10 or a lower part of the tower 8. A ballast pump 29 for filling each ballast chamber 27 with water to submerge the floating body 10 is disposed inside the pump chamber 28. By adjusting the volume of the ballast water inside the ballast chambers 27 suitably, the relative position of the floating body 10 with respect to the water line WL or the attitude of the floating body 10 is adjusted. When the floating-body type wind turbine power generating apparatus 1 is in operation, the floating body 10 is normally moored on the water surface with the water line WL being positioned above the upper surface of the lower hull 20, as illustrated in FIG. 3.

Further, as illustrated in FIG. 2, a plurality of mooring lines 30 coupled to anchors 25 fixed to the water bottom E may be connected to the floating body 10 in a catenary fashion so as to form catenary curves. In this case, the floating body 10 is moored on the ocean by the anchors 25 and the mooring lines 30, while resisting a drift force and a rotational moment applied to the floating body 10. The ends of the mooring lines 30 adjacent to the floating body are fixed to the floating body 10 by fixing parts. In one embodiment, as illustrated in FIG. 3, support structures which support the ends of the mooring lines 30 adjacent to the floating body to the floating body 10 may each include a stopper 31 for preventing the mooring line 30 from falling down, and a guide portion 32 disposed closer to the anchors 26 than the stopper 31 is for guiding the mooring line 30 in the substantially vertical direction. One support structure is provided for each of the mooring lines 30 connected to the respective three columns 12, 14, 16. Each mooring line 30 includes a main line such as a chain, a wire rope, a synthetic-resin rope or a rope combining the above, a joint such as a shackle, and an intermediate support member such as an intermediate buoy and an intermediate sinker, for maintaining the position of the floating body 10.

As illustrated in FIG. 3, in one embodiment, the wind turbine generator 2 includes a rotation shaft 40 coupled to a rotor 5 having the blade 3 and the hub 4, a generator 47 which generates electric power, and a drivetrain 41 which transmits rotation energy of the rotation shaft 40 to the generator 47. In the drawing, the drivetrain 41 and the generator 47 are disposed inside the nacelle 6 as an example. However, the location for disposing the above is not particularly limited, and at least one of the above may be disposed on the tower 8 side, for instance.

In the wind turbine generator 2 with the above configuration, rotation energy of the rotor 5 rotating by receiving wind is inputted to the generator 47 via the drivetrain 41, and electric power is generated in the generator 47. The electric power generated in the generator 47 is transmitted to a sea-bottom cable 50 via a transmission line 52A arranged inside the nacelle 6 and the tower 8, and then transmitted to a utility grid via the sea-bottom cable 50.

The rotation shaft 40 rotates along with the rotor 5 including the blade 3 and the hub 4.

In one embodiment, the drivetrain 41 includes a hydraulic pump 42 mounted to the rotation shaft 40, and a hydraulic motor 43 connected to the hydraulic pump 42 via a high pressure oil line 44 and a low pressure oil line 45. The hydraulic pump 42 increases a pressure of working oil by being driven by the rotation shaft 40 to generate high-pressure working oil (pressurized oil). The pressurized oil generated in the hydraulic pump 42 is supplied to the hydraulic motor 43 via the high pressure oil line 44, and this pressurized oil drives the hydraulic motor 43. The low pressure working oil having performed work in the hydraulic motor 43 is returned again to the hydraulic pump 42 via the low pressure oil line 45. Further, the output shaft of the hydraulic motor 43 is connected to the input shaft of the generator 47, so that rotation of the hydraulic motor 43 is inputted to the generator 47. While the hydraulic transmission is used as the drivetrain 41 in the drawing for example, the configuration of the drivetrain 41 is not limited to this. Another drivetrain such as a gear-type speed increasing unit may be used, or the rotation shaft 40 and the generator 47 may be directly connected without a drivetrain 41.

Inside the hub 4, a pitch drive mechanism 49 for adjusting the pitch angle of the blade 3 is disposed. The pitch drive mechanism 49 adjusts the pitch angle of the blade 3 in accordance with the wind velocity while the wind turbine generator 2 is in operation, or adjusts the pitch angle of the blade 3 to the feather side or the fine side when the wind turbine generator 2 is to be stopped or started. The pitch drive mechanism 49 may be provided for each of a plurality of blades 3, in case of which the pitch angles of the blades 3 are controlled simultaneously or independently among the blades.

In one embodiment, a variety of auxiliary machines is provided for the wind turbine generator 2. As an auxiliary machine, for instance, an aircraft warning light 60 disposed on an upper part of the nacelle 6, a marine light 62 disposed on the platform 9, a boost pump 48 disposed inside the nacelle 6, or the like can be mentioned. Here, the boost pump 45 is disposed for the purpose of maintaining a pressure of the low pressure oil line 45. The boost pump 48 may be disposed in a line connecting the low pressure oil line 45 and a tank (not illustrated) for storing working oil.

As illustrated in FIGS. 3 and 4, the floating-body type wind turbine power generating apparatus 1 includes an interior electric-distribution network 51 for supplying electric power to the above pitch drive mechanism 49, the boost pump 48, the variety of auxiliary machines of the wind turbine generator 2, or the like.

In some embodiment, the interior electric distribution network 51 includes a transmission line 52A for transmitting electric power generated in the generator 47 to the sea-bottom cable 50, and a load line 52B connected to the transmission line 52A.

A switch 521 and a transformer 522 are disposed in the transmission line 52A. The generator 47 is connected to the sea-bottom cable 50 by the transmission line 52A via the switch 521 and the transformer 522.

The sea-bottom cable 50 is disposed between the floating-body type wind turbine power generating apparatus 1 and the substation 102. Further, the sea-bottom cable 50 may be connected to the grid 100 via the substation 102 and the sea-bottom cable 103.

On the other hand, the load line 52B is to connect a load of the floating-body type wind turbine power generating apparatus 1 to the transmission line 52A. A wind-turbine controller center (WTG. CC) 54, a nacelle control center (nacelle. CC) 56, a floating-body control center (floating-body. CC) 57, and an emergency control center (emergency. CC) 58 are connected to the load line 52B via the transformer 523. Here, a control center includes a molded case circuit breaker, a switch, an electromagnetic contactor, a starting reactor and the like. A control center controls the electric supply to each load.

The wind-turbine control center 54 distributes electric power transmitted from the generator 47 via the load line 52B to the nacelle control center 56, the floating-body control center 57, and the emergency control center 58, while the floating-body type wind turbine power generating apparatus 1 is operated. Further, the wind-turbine control center 54 may distribute the electric power transmitted from the grid 100 via the load line 52B to the control centers 56, 57, 58 while the floating-body type wind turbine power generating apparatus 1 is shutdown.

The nacelle control center 56 is disposed inside the nacelle 6, and controls electric supply to devices including the pitch drive mechanism 49. Further, an electric power source (not illustrated) such as a diesel generator or the like may be connected to the nacelle control center 56, so that electric power is supplied from the electric source to the pitch drive mechanism 49 if electric power cannot be supplied from the grid 100 or the generator 47. Further, the nacelle control center 46 is configured to supply electric power to the pitch drive mechanism 49 and to check operation of the pitch drive mechanism when operation of each device is checked during maintenance.

The floating-body control center 57 is disposed on a lower part of the tower 8 or the floating body 10, and controls electric supply to the ballast pump 29. Further, an electric power source 66 such as a diesel generator may be connected to the floating-body control center 57, so that electric power is supplied from the electric power source 66 to the ballast pump 29 if electric power cannot be supplied from the grid 100 or the generator 47. Here, the electric power source 66 may be a temporary power source. Further, the floating-body control center 57 is configured to supply electric power to the ballast pump 29 to operate the ballast pump 29 and check the float/sink operation of the floating-body 10 when operation of each device is checked during maintenance.

The emergency control center 58 is disposed on a lower part of the tower 8 or the floating body 10, and controls electric supply to the various auxiliary machines of the wind turbine generator 2, such as the aircraft warning light 60, the marine light 62, and the boost pump 48. Further, a backup electric power source 64 such as a diesel engine may be connected to the emergency control center 57, so that electric power is supplied to the various auxiliary machines from the backup electric power source 64 if electric power cannot be supplied from the grid 100 or the generator 47. The backup electric power source 64 may be disposed on a lower part of the tower 8 or the floating body 10. Further, a fuel tank 65 for supplying fuel to the backup electric power source 64 may be disposed on a lower part of the tower 8 or the floating body 10. In this case, the fuel tank 65 may have a capacity that is capable of storing a volume of oil that enables continuous operation for several days (for instance, 10 days), in case of inaccessibility due to bad weather on the ocean after power loss of the wind turbine generator 2. The backup electric power source 64 may be a temporary power source. Further, the emergency control center 58 is configured to supply electric power to the various auxiliary machines (for instance, the aircraft warning light 60, the marine light 62, the boost pump 48, or the like) of the wind turbine generator 1 to check operation of the auxiliary machines when operation of each device is checked during maintenance. At this time, electric power is supplied to the emergency control center 58 from the backup electric power source 64, and fuel is supplied to the backup electric power source 64 from the fuel tank 65.

Figure 5A:
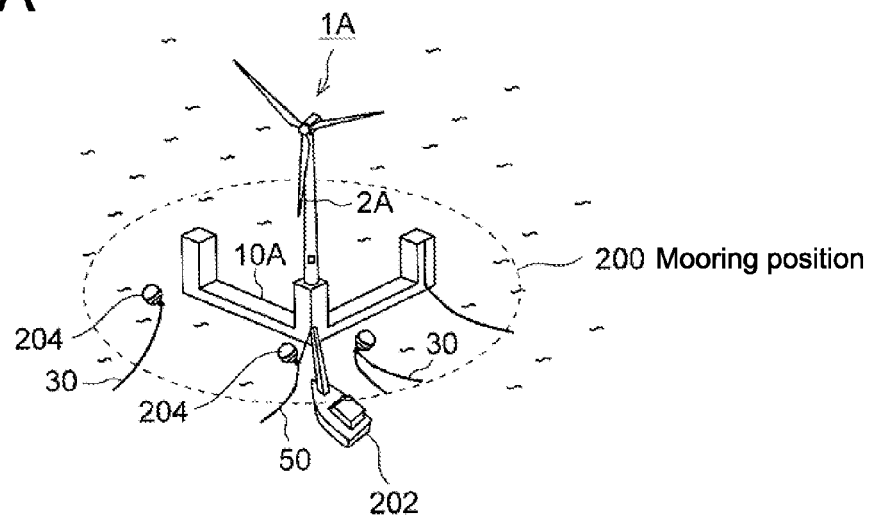
FIG. 5A is a diagram for describing a method of maintaining a floating-body type wind turbine power generating apparatus according to one embodiment of the present invention, where the first floating-body type wind turbine power generating apparatus is being separated from mooring lines.
Figure 5B:
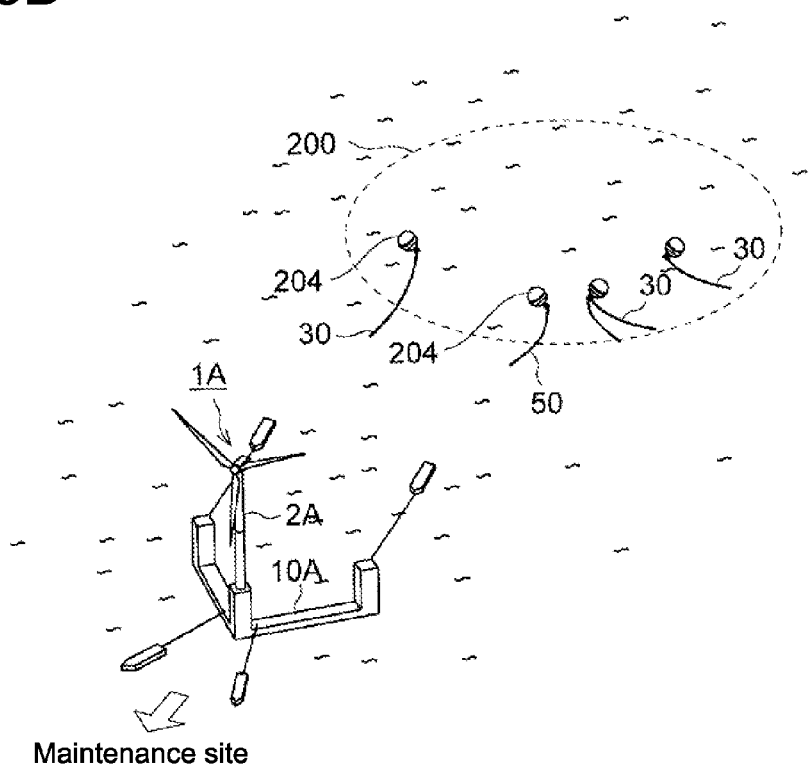
FIG. 5B is a diagram for describing a method of maintaining a floating-body type wind turbine power generating apparatus according to the first embodiment, where the first floating-body type wind turbine power generating apparatus is being moved from the mooring lines.
Figure 5C:
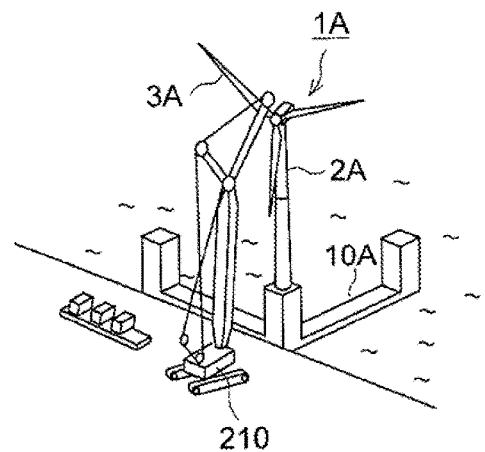
FIG. 5C is a diagram for describing a method of maintaining a floating-body type wind turbine power generating apparatus, where maintenance is being performed on the first floating-body type wind turbine power generating apparatus.
Figure 5D:
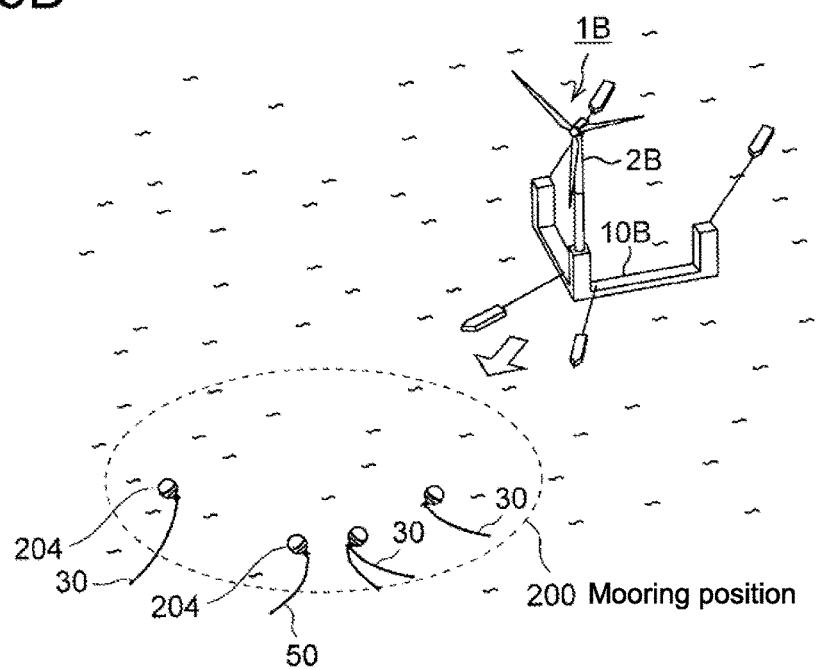
FIG. 5D is a diagram for describing a method of maintaining a floating-body type wind turbine power generating apparatus, where maintenance is being performed on the second floating-body type wind turbine power generating apparatus.
Figure 5E:
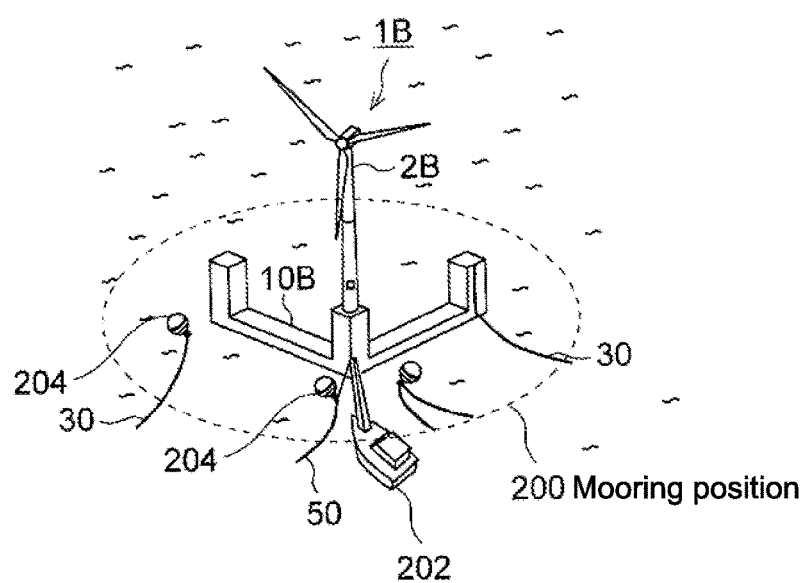
FIG. 5E is a diagram for describing a method of maintaining a floating-body type wind turbine power generating apparatus, where mooring lines are being connected to the second floating-body type wind turbine power generating apparatus.

Next, with reference to FIGS. 5A to 5E, a method of maintaining the floating-body type wind turbine power generating apparatus 1 according to the present embodiment will be described. FIGS. 5A to 5E are diagrams for describing a method of maintaining a floating-body type wind turbine power generating apparatus according to one embodiment of the present invention. FIG. 5A is a diagram of the first floating-body type wind turbine power generating apparatus being separated from mooring lines. FIG. 5B is a diagram of the first floating-body type wind turbine power generating apparatus being moved from the mooring lines. FIG. 5C is a diagram of maintenance being performed on the first floating-body type wind turbine power generating apparatus. FIG. 5D is a diagram of maintenance being performed on the second floating-body type wind turbine power generating apparatus. FIG. 5E is a diagram of mooring lines being connected to the second floating-body type wind turbine power generating apparatus.

In the following description, a floating-body type wind turbine power generating apparatus having a maintenance-target section is referred to as the first floating-body type wind turbine power generating apparatus 1A, and a floating-body type wind turbine power generating apparatus having no maintenance-target section is referred to as the second floating-body type wind turbine power generating apparatus 1B. In the embodiment illustrated in FIGS. 5A to 5E, the first floating-body type wind turbine power generating apparatus 1A and the second floating-type wind turbine power generating apparatus 1B may be the same apparatus.

In one embodiment, as illustrated in FIG. 5A, when maintenance is to be performed on the first floating-body type wind turbine power generating apparatus 1A moored at a mooring position 200, firstly conducted is a work for separating the mooring lines 30 and the sea-bottom cable 50 attached to the floating body 10A of the first floating-body type wind turbine power generating apparatus 1A. Here, a crane or the like mounted to a work ship 202 may be used to perform the separation work, for instance, because the mooring lines 30 are heavy. The mooring lines 30 and the sea-bottom cable 50 separated from the floating body 10A are retained by floating-body structures 204. A floating-body structure 204 is not particularly limited as long as it is a structure that floats on the water, and may be a buoy, a ship body, a mega float, or the like.

Subsequently, as illustrated in FIG. 5B, once the mooring lines 30 and the sea-bottom cables 50 connected to the floating body 10A are all separated and retained by the floating-body structures 204, the floating-type wind turbine power generating apparatus 1A is moved from the mooring position 200 to the maintenance site.

When the floating-body type wind turbine power generating apparatus 1A has arrived at the maintenance site, the maintenance work is performed. The maintenance site may be a site on water (for instance, by a shore) or on land (for instance, in a dock), where the conditions of the surrounding environment such as wind and waves are better than those at the mooring position. In this way, it is possible to perform maintenance works under stable work environments. Alternatively, the floating-type wind turbine power generating apparatus 1A may be maintained while being berthed along a pier, which makes it possible to restrict sway of the floating-body type wind turbine power generating apparatus 1A and to form a stable work environment. As the maintenance works, repair and replacement of units constituting the wind turbine generator 2A, repair and replacement of units constituting the floating body 10A, repair and replacement of the various auxiliary machines, and the like can be mentioned.

For instance, in a case where the blade 3A of the first floating-body type wind turbine power generating apparatus 1A is to be replaced, as illustrated in FIG. 5C, the blade 3A of the first floating-body type wind turbine power generating apparatus 1A may be replaced while the first floating-body type wind turbine power generating apparatus 1A is berthed along a pier. In this case, a crane 210 disposed on the land is used to hoist down one blade 3A and to hoist up and attach another blade 3A to the wind turbine generator 2A. Performing a replacement work of blades 3A as described above makes it possible to improve the work efficiency, and to use the crane 210 having a large size.

Further, also in a case where the drivetrain of the first floating-body type wind turbine power generating apparatus 1A is to be replaced, a unit constituting at least a part of the drivetrain may be replaced while the first floating-body type wind turbine power generating apparatus 1A is berthed along a pier. In this case, as illustrated in FIG. 2, the drivetrain may include a hydraulic transmission including a hydraulic pump 42 and a hydraulic motor 43, and the unit to be replaced may be at least one of the hydraulic pump 42, the hydraulic motor 43 or the generator 47. Performing a replacement work of the drivetrain 41 as described above makes it possible to improve the work efficiency, and to use the crane 210 having a large size.

As a result of performing maintenance on the first floating-body type wind turbine power generating apparatus 1A, it is possible to obtain the second floating-body type wind turbine power generating apparatus 1B not including a maintenance section.

Once the maintenance work is completed, as illustrated in FIG. 5D, the second floating-body type wind turbine power generating apparatus 1B having undergone maintenance is transferred to the mooring position 200. Once the second floating-body type wind turbine power generating apparatus 1B arrives at the mooring position 200, the mooring lines 30 and the sea-bottom cable 50 are detached from the floating-body structures 204 to be connected to the floating body 10B of the second floating-body type wind turbine power generating apparatus 1B. At this time, a crane or the like mounted to a work ship 202 may be used to reattach the mooring lines 30 and the sea-bottom cable 50 from the floating-body structures 204 to the floating body 10B.

As described above, the first floating-body type wind turbine power generating apparatus 1A having a maintenance-target section is transferred from the mooring position, and the second floating-body type wind turbine power generating apparatus 1B without a maintenance-target section is transferred to the mooring position 200. In this way, it is possible to perform an extensive maintenance work which is not suitable to be performed at the mooring position 200 of a wind turbine power generating apparatus at another location. Thus, it is possible to perform maintenance on the floating-body type wind turbine power generating apparatus 1 regardless of the conditions of the surrounding environment of the mooring position 200 of the wind turbine power generating apparatus 1.

Further, it is possible to connect the mooring lines 30 and the sea-bottom cable 50 easily to the floating body when the second floating-body type wind turbine power generating apparatus 1B is to be moored, by separating the mooring lines 30 and the sea-bottom cable 50 from the floating body 10A to be retained by the floating-body structures 204 when the first floating-body type wind turbine power generating apparatus 1A is transferred.

Still further, it is possible to operate the wind turbine power generation system without preparing a floating-body type wind turbine power generating apparatus 1 for replacement as a premise, by performing maintenance on the first floating-body type wind turbine power generating apparatus 1A and then returning the same wind turbine power generating apparatus to the mooring position as the second floating-body type wind turbine power generating apparatus 1B. That is, it is possible to run the wind turbine power generation system while reducing the installation cost. A wind turbine power generation system here refers to a combination of at least one floating-body type wind turbine power generating apparatus 1.

Figure 6A:
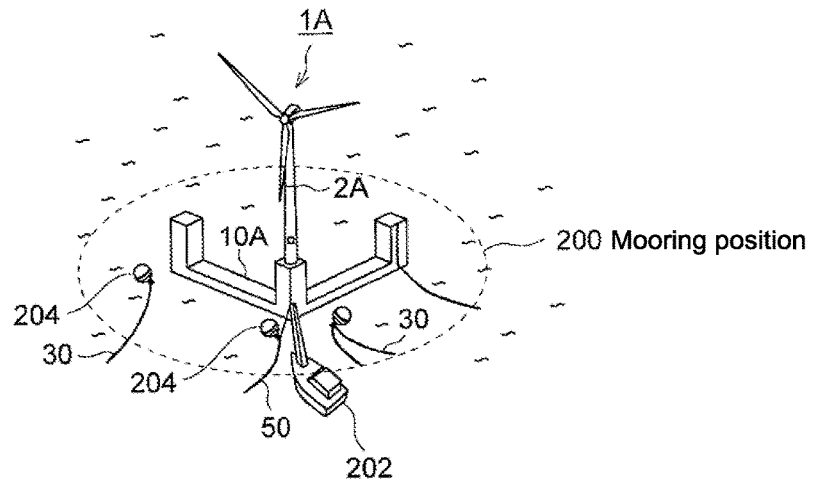
FIG. 6A is a diagram for describing a method of maintaining a floating-body type wind turbine power generating apparatus, where the first floating-body type wind turbine power generating apparatus is being separated from the mooring lines.
Figure 6B:
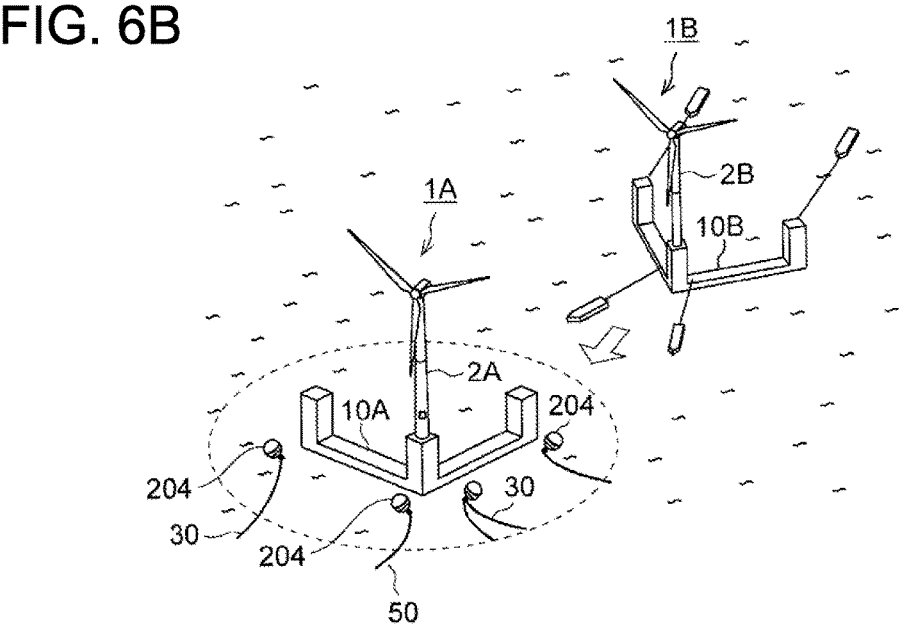
FIG. 6B is a diagram for describing a method of maintaining a floating-body type wind turbine power generating apparatus, before the first floating-body type wind turbine power generating apparatus is replaced with the second floating-body type wind turbine power generating apparatus.
Figure 6C:
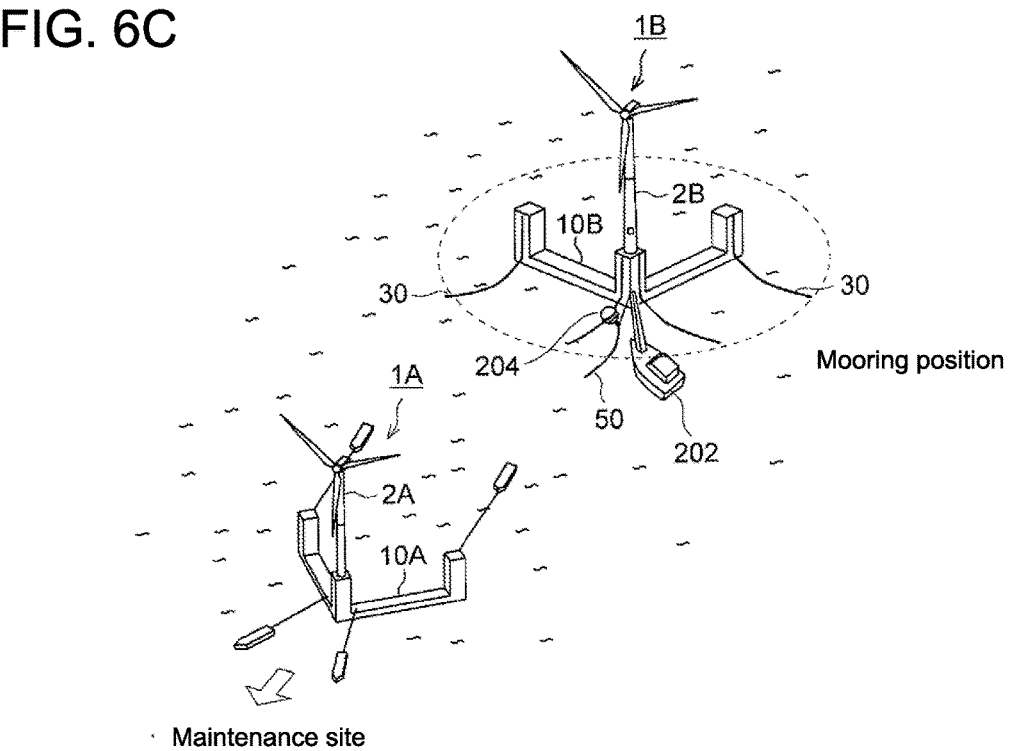
FIG. 6C is a diagram for describing a method of maintaining a floating-body type wind turbine power generating apparatus, after the first floating-body type wind turbine power generating apparatus is replaced with the second floating-body type wind turbine power generating apparatus.
Figure 6D:
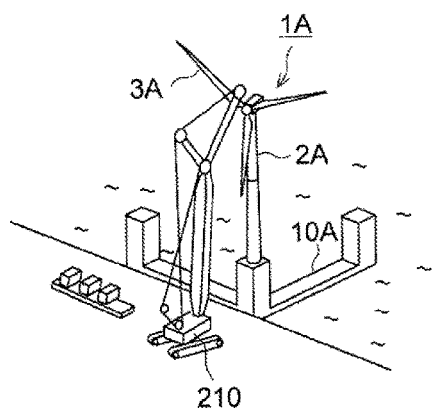
FIG. 6D is a diagram for describing a method of maintaining a floating-body type wind turbine power generating apparatus, where maintenance is being performed on the first floating-body type wind turbine power generating apparatus.

Further, in another embodiment, the maintenance may be performed as illustrated in FIGS. 6A to 6D. FIGS. 6A to 6D are diagrams for describing a method of maintaining a floating-body type wind turbine power generating apparatus. FIG. 6A is a diagram of the first floating-body type wind turbine power generating apparatus being separated from the mooring lines. FIG. 6B is a diagram before the first floating-body type wind turbine power generating apparatus is replaced with the second floating-body type wind turbine power generating apparatus. FIG. 6C is a diagram after the first floating-body type wind turbine power generating apparatus is replaced with the second floating-body type wind turbine power generating apparatus. FIG. 6D is a diagram of maintenance being performed on the first floating-body type wind turbine power generating apparatus.

As illustrated in FIG. 6A, when maintenance is to be performed on the first floating-body type wind turbine power generating apparatus 1A moored at the mooring position 200, firstly conducted is a work for separating the mooring lines 30 and the sea-bottom cable 50 attached to the floating body 10A of the first floating-body type wind turbine power generating apparatus 1A. The separated mooring lines 30 and the sea-bottom cable 50 are retained by the floating-body structures 204.

Subsequently, as illustrated in FIG. 5B, once the mooring lines 30 and the sea-bottom cables 50 connected to the floating body 10A are all separated and retained by the floating-body structures 204, the floating-type wind turbine power generating apparatus 1A is transferred from the mooring position 200 toward the maintenance site. Further, after the first floating-body type wind turbine power generating apparatus 1A is moved away from the mooring position 200, the second floating-body type wind turbine power generating apparatus 1B, which is a different apparatus, is transferred to the mooring position 200. The second floating-body type wind turbine power generating apparatus 1B may be a wind turbine power generating apparatus having undergone maintenance after being used, or an unused wind turbine power generating apparatus.

Once the second floating-body type wind turbine power generating apparatus 1B arrives at the mooring position 20 as illustrated in FIG. 6C, the mooring lines 30 and the sea-bottom cable 50 are connected to the floating body 10B of the second floating-body type wind turbine power generating apparatus 1B. In this way, it is possible to operate the second floating-type wind turbine power generating apparatus 1B while maintenance is performed on the first floating-body type wind turbine power generating apparatus 1A, by transferring the first floating-body type wind turbine power generating apparatus 1A away from the mooring position 200 and then moving another apparatus, which is the second floating-body type wind turbine power generating apparatus 1B, to the mooring position 200. As a result, it is possible to improve the facility operation rate of the wind turbine power generation system.

As illustrated in FIG. 6D, when the floating-body type wind turbine power generating apparatus 1A has arrived at the maintenance site, the maintenance work is performed. The maintenance site may be a site on water (for instance, by a shore), or on land (for instance, a dock), where the conditions of the surrounding environment such as wind and waves are better than those at the mooring position. In this way, it is possible to perform maintenance works under stable work environments. Alternatively, the floating-type wind turbine power generating apparatus 1A may be maintained while being berthed along a pier, which makes it possible to restrict sway of the floating-body type wind turbine power generating apparatus 1A and to form a stable work environment. The maintenance work is the same as that of the embodiment illustrated in FIG. 5C, and thus not described here in detail.

The maintenance method illustrated in FIGS. 5A-5E or 6A-6D may further include the following configuration.

After the maintenance work is performed and before the second floating-body type wind turbine power generating apparatus 1B is transferred to the mooring position 200, operation of the second floating-body type wind turbine power generating apparatus 1B is checked at a site for checking operation. Here, the site for checking operation may be a site on water (for instance, by a shore) or on land (for instance, in a dock), where the conditions of the surrounding environment such as wind and waves are better than those at the mooring position 200. In this way, it is possible to check operation under stable work environments. Alternatively, operation may be checked while the second floating-body type wind turbine power generating apparatus 1B is berthed along a pier, which makes it possible to restrict sway of the second floating-body type wind turbine power generating apparatus 1B and to form a stable work environment. As the operation check, for instance, float/sink operation check of the floating body 10A, operation check of each auxiliary machine, operation check of the pitch of the blade 3B or the like can be mentioned.

In a case where the operation check is performed after the second floating-body type wind turbine power generating apparatus 1B is transferred to the mooring position 200, if there is a problem in the check result, it may be necessary to transfer the second floating-body type wind turbine power generating apparatus 1B back to the maintenance site again. Thus, in the above embodiment, the operation check is performed before the second floating-body type wind turbine power generating apparatus 1B is transferred to the mooring position 200, which makes it possible to perform the work of installing the second floating-body type wind turbine power generating apparatus 1B to the mooring position 200 efficiently.

Further, it is possible to perform the operation check in a more stable work environment, such as a site on ocean or land where the conditions of the surrounding environment like wind and waves are calmer than those at the mooring position, or a position where the floating-body type wind turbine power generating apparatus is berthed along a pier. Thus, it is possible to improve efficiency of the work of operation check.

Now, examples of operation check will be described.

When float/sink operation of the floating body 10B is checked, the ballast pump 29 controlled by the floating-body control center 57 is used to fill the ballast chamber of the floating body 10B with water and to check float/sink operation of the floating body 10B. At this time, the float/sink operation may be checked while only a lower part of the tower 8 of the wind turbine generator 3B is installed. Specifically, the tower 8 is constituted by a plurality of cylindrical tower sections stacked on one another. In this case, the float/sink operation of the floating body 10B may be performed while only a lower tower section is placed on the floating body 10B. Since the ballast pump 29 and the floating-body control center 57 are disposed on a lower part of the tower of the wind turbine generator 3A or the floating body 10A, it is possible to check the float/sink operation of the floating body 10B even before the wind turbine generator 3B is completely assembled on the floating body 10B.

Further, it is possible to check the float/sink operation of the floating body 10B of the wind turbine generator 3B before the second floating-body type wind turbine power generating apparatus 1B is transferred to the mooring position 200. Thus, it is possible to prevent an event in which the second floating-body type wind turbine power generating apparatus 1B inevitably needs to be returned to the maintenance site due to a failure in the float/sink operation of the floating body 10B after installation of the second floating-body type wind turbine power generating apparatus 1B to the mooring position 200. Further, it is possible to perform the operation check under a more stable work environment than that of the mooring position 200, which makes it possible to improve efficiency of the work for checking float/sink operation.

Further, since the ballast pump 29 and the floating-body control center 57 are disposed on a lower part of the tower of the wind turbine generator 3B or the floating body, it is possible to check the float/sink operation of the floating body 10B even before the wind turbine generator 3B is completely assembled on the floating body 10B.

When the operation of the pitch drive mechanism 49 is to be checked, electric power is supplied to the pitch drive mechanism 49 from an electric power source under control of the nacelle control center 56 and whether the pitch drive mechanism 49 operates normally is checked, while the blade 3 and the nacelle 6 are mounted to the second floating-body type wind turbine power generating apparatus 1B.

In this way, it is possible to check the operation of the pitch drive mechanism 49 before the second floating-body type wind turbine power generating apparatus 1B is transferred to the mooring position 200. Thus, it is possible to prevent an event in which the second floating-body type wind turbine power generating apparatus 1B inevitably needs to be returned to the maintenance site due to a failure in the pitch drive mechanism 49 after installation of the second floating-body type wind turbine power generating apparatus 1B to the mooring position 200. Further, it is possible to check the operation of the pitch drive mechanism 49 under a more stable work environment than that of the mooring position 200, which makes it possible to improve efficiency of the work for operation check.

When the operation of the various auxiliary machines of the wind turbine generator 3B is checked, electric power is supplied to the various auxiliary machines under control of the emergency control center 58, and the operation of each auxiliary machine is checked. For instance, electric power is supplied to the aircraft warning light 60 from the emergency control center 58 to check the lighting. The operation of the other auxiliary machines such as the marine light 62 and the boost pump 48 are similarly checked. Here, upon the operation check, electric power may be supplied from the backup electric power source 64 to each auxiliary machine.

In this way, it is possible to check the operation of the auxiliary machines of the wind turbine generator 3B before the second floating-body type wind turbine power generating apparatus 1B is transferred to the mooring position 200. Thus, it is possible to prevent an event in which the second floating-body type wind turbine power generating apparatus 1B inevitably needs to be returned to the maintenance site due to a failure in an auxiliary machine of the wind turbine generator 3B after installation of the second floating-body type wind turbine power generating apparatus 1B to the mooring position 200. Further, it is possible to check operation of the auxiliary machines under a more stable work environment than that of the mooring position 200, which makes it possible to improve efficiency of the work for operation check.

Further when the operation of the backup electric power source 64 is checked, fuel for power generation is supplied to the backup electric power source 64 from the fuel tank 65 to check whether the backup electric power source operates normally.

In this way, it is possible to check the operation of the backup electric power source 64 before the second floating-body type wind turbine power generating apparatus 1B is transferred to the mooring position 200. Thus, it is possible to prevent an event in which the second floating-body type wind turbine power generating apparatus 1B inevitably needs to be returned to the maintenance site due to a failure in the backup electric power source 64 after installation of the second floating-body type wind turbine power generating apparatus 1B to the mooring position 200. Further, it is possible to check operation of the backup electric power source 64 under a more stable work environment than that of the mooring position 200, which makes it possible to improve efficiency of the work for operation check.

The operation of the interior electric distribution network 51 may be checked similarly. For instance, under control of the emergency control center 58, electric power is supplied to the switch 521 or the transformers 522, 523 of the interior electric distribution network 51 to check whether the interior electric distribution network 51 operates normally.

In this way, it is possible to check the operation of the interior electric distribution network 51 before the second floating-body type wind turbine power generating apparatus 1B is transferred to the mooring position 200. Thus, it is possible to prevent an event in which the second floating-body type wind turbine power generating apparatus 1B inevitably needs to be returned again to the maintenance site due to a failure in the interior electric distribution network 51 after installation of the second floating-body type wind turbine power generating apparatus 1B to the mooring position 200. Further, it is possible to check operation of the interior electric distribution network 51 under a more stable work environment than that of the mooring position 200, which makes it possible to improve efficiency of the work for operation check.

As described above, according to the above embodiment, it is possible to perform maintenance on the floating-body type wind turbine power generating apparatus 1 regardless of the conditions of the surrounding environment of the mooring position 200, by transferring the first floating-body type wind turbine power generating apparatus 1A away from the mooring position and transferring the second floating-body type wind turbine power generating apparatus 1B having no maintenance-target section to the mooring position 200.

Further, it is possible to connect the mooring lines 30 and the cable 50 easily to the floating body when the second floating-body type wind turbine power generating apparatus 1B is moored, by separating the mooring lines 30 and the cable 50 from the floating body 10A and retaining the same with the floating-body structures 204 when the first floating-body type wind turbine power generating apparatus 1A is transferred.

Embodiments of the present invention were described in detail above, but the present invention is not limited thereto, and various amendments and modifications may be implemented within a scope that does not depart from the present invention.

DESCRIPTION OF THE REFERENCE NUMERALS

1 Floating-body type wind turbine power generating apparatus
2 Wind turbine
3 Blade
4 Hub
5 Rotor
6 Nacelle
8 Tower
9 Platform
10, 10A, 10B Floating body
12 First column
14 Second column
16 Third column
20 First lower hull
22 Second lower hull
30 Mooring line
26 Anchor
27 Ballast chamber
28 Pump chamber
29 Ballast pump
31 Stopper
32 Guide portion
40 Rotation shaft
41 Drivetrain (hydraulic transmission)
42 Hydraulic pump
43 Hydraulic motor
44 High pressure oil line
45 Low pressure oil line
47 Generator
48 Boost pump
49 Pitch drive mechanism
50, 103 Sea-bottom cable
51 Interior electric distribution network
52A Transmission line
52B Load line
54 Wind-turbine control center (WTG. CC)
56 Nacelle control center (nacelle. CC)
57 Floating-body control center (floating-body. CC)
58 Emergency control center (emergency. CC)
60 Aircraft warning light
62 Marine light
64 Backup electric power source
65 Fuel tank
66 Electric power source 100 Grid
200 Mooring position
204 Floating-body structure
521 Switch
522, 523 Transformer

The invention claimed is:

1. A method of maintaining a floating-body type wind turbine power generating apparatus including a wind turbine generator disposed on a floating body moored at a mooring position by a mooring line, the floating-body type wind turbine power generating apparatus being configured to supply electric power generated by the wind turbine generator to a cable, the method comprising:
a separation step of separating the mooring line and the cable from the floating body of a first floating-body type wind turbine power generating apparatus including a maintenance-target section;
a retention step of retaining the mooring line and the cable by a floating-body structure, after the separation step;
a first transfer step of transferring the first floating-body type wind turbine power generating apparatus from the mooring position, after the separation step;
a second transfer step of transferring a second floating-body type wind turbine power generating apparatus having no maintenance-target section to the mooring position;
a connection step of detaching the mooring line and the cable from the floating-body structure and connecting the mooring line and the cable to the second floating-body type wind turbine power generating apparatus, after the second transfer step; and
an operation-check step of checking operation of the second floating-body type wind turbine power generating apparatus at a site for operation check that is different from the mooring position, before the second transfer step,
wherein the floating-body type wind turbine power generating apparatus includes a transmission line for transmitting the electric power from the wind turbine generator to the cable; a load line connected to the transmission line; a ballast pump for floating and submerging the floating bod; and a floating-body control center connected to the transmission line via the load line and configured to control the ballast pump,
wherein the ballast pump and the floating-body control center are disposed on a lower part of a tower of the wind turbine generator or the floating body, and
wherein, in the operation-check step, electric power is supplied to the ballast pump from an electric power source connected to the floating-body control center not via the transmission line, under control of the floating-body control center, and the ballast pump is operated to check float/sink operation of the floating body in a state where only the lower part of the tower of the wind turbine generator is installed on the floating body, at the site for operation check.

2. The method of maintaining the floating-body type wind turbine power generating apparatus according to claim 1, further comprising a maintenance step of performing maintenance on the first floating-body type wind turbine power generating apparatus to obtain the second floating-body type wind turbine power generating apparatus, after the first transfer step.

3. The method of maintaining the floating-body type wind turbine power generating apparatus according to claim 2, wherein, in the maintenance step, a blade of the first floating-body type wind turbine power generating apparatus is replaced while the first floating-body type wind turbine power generating apparatus is berthed along a pier.

4. The method of maintaining the floating-body type wind turbine power generating apparatus according to claim 2, wherein, in the maintenance step, a unit constituting at least a part of a drivetrain of the first floating-body type wind turbine power generating apparatus is replaced while the first floating-body type wind turbine power generating apparatus is berthed along a pier.

5. The method of maintaining the floating-body type wind turbine power generating apparatus according to claim 4, wherein the drivetrain includes a hydraulic transmission for transmitting rotation energy of a rotor of the wind turbine generator to a generator, the hydraulic transmission including a hydraulic pump and a hydraulic motor, and wherein the unit is at least one of the hydraulic pump, the hydraulic motor or the generator.

6. The method of maintaining the floating-body type wind turbine power generating apparatus according to claim 1, wherein, in the second transfer step, the second floating-body type wind turbine power generating apparatus, which is not the first floating-body type wind turbine power generating apparatus, is transferred to the mooring position.

7. The method of maintaining the floating-body type wind turbine power generating apparatus according to claim 1, wherein the floating-body type wind turbine power generating apparatus includes an auxiliary machine of the wind turbine generator and an emergency control center for controlling the auxiliary machine, and wherein, in the operation-check step, the electric power is supplied to the auxiliary machine from an electric power source under control of the emergency control center, and operation of the auxiliary machine is checked, at the site for operation check.

8. The method of maintaining the floating-body type wind turbine power generating apparatus according to claim 1, wherein the electric power source is a backup electric power source for supplying electric power to each part of the floating-body type wind turbine power generating apparatus in case of emergency, wherein the floating-body type wind turbine power generating apparatus includes a fuel tank for supplying a fuel for power generation to the backup electric power source, and wherein, in the operation-check step, the fuel for power generation is supplied to the backup electric power source from the fuel tank to check operation of the backup electric power source.

9. The method of maintaining the floating-body type wind turbine power generating apparatus according to claim 1, wherein the floating-body type wind turbine power generating apparatus includes an interior electric distribution network disposed between a generator of the wind turbine generator and the cable, the interior electric distribution network including a transformer and a switch, and wherein, in the operation-check step, operation of the interior electric distribution network is checked at the site for operation check.

10. The method of maintaining the floating-body type wind turbine power generating apparatus according to claim 1, wherein the floating-body type wind turbine power generating apparatus includes a pitch drive mechanism for varying a pitch angle of a blade of the wind turbine generator, and a nacelle control center disposed inside a nacelle of the wind turbine generator and configured to control devices including the pitch drive mechanism, and wherein, in the operation-check step, the electric power is supplied to the pitch drive mechanism from an electric power source under control of the nacelle control center to check operation of the pitch drive mechanism, while the blade and the nacelle are mounted to the second floating-body type wind turbine power generating apparatus.

11. The method of maintaining the floating-body type wind turbine power generating apparatus according to claim 1, wherein the floating-body type wind turbine power generating apparatus includes a ballast pump for floating and submerging the floating body, and a floating-body control center for controlling the ballast pump, wherein the ballast pump and the floating-body control center are disposed on a lower part of a tower of the wind turbine generator or the floating body, and wherein, in the operation-check step, the electric power is supplied to the ballast pump from an electric power source under control of the floating-body control center, and the ballast pump is operated to check float/sink operation of the floating body before the wind turbine generator is completely assembled on the floating body, at the site for operation check.

12. The method of maintaining the floating-body type wind turbine power generating apparatus according to claim 1, wherein the floating-body type wind turbine power generating apparatus further includes an emergency control center configured to supply electric power to an auxiliary machine of the wind turbine generator.

* * * * *